(12) United States Patent
Shi et al.

(10) Patent No.: US 11,119,202 B2
(45) Date of Patent: Sep. 14, 2021

(54) DETECTOR ASSEMBLY, DETECTOR, AND LASER RANGING SYSTEM

(71) Applicant: NORTHWEST INSTRUMENT INC., Dover, NJ (US)

(72) Inventors: Xin Shi, Shanghai (CN); David Xing, Dover, NJ (US)

(73) Assignee: NORTHWEST INSTRUMENT INC., Dover, NJ (US)

(*) Notice: Subject to any disclaimer, the term of this patent is extended or adjusted under 35 U.S.C. 154(b) by 0 days.

(21) Appl. No.: 16/636,508

(22) PCT Filed: Jul. 25, 2018

(86) PCT No.: PCT/CN2018/096945
§ 371 (c)(1),
(2) Date: Feb. 4, 2020

(87) PCT Pub. No.: WO2019/024730
PCT Pub. Date: Feb. 7, 2019

(65) Prior Publication Data
US 2020/0249336 A1 Aug. 6, 2020

(30) Foreign Application Priority Data
Aug. 4, 2017 (CN) .......................... 201710661768.7

(51) Int. Cl.
*G08G 1/16* (2006.01)
*G01S 11/12* (2006.01)
(Continued)

(52) U.S. Cl.
CPC ............. *G01S 11/12* (2013.01); *G01S 7/4816* (2013.01); *G01S 17/08* (2013.01)

(58) Field of Classification Search
CPC ........ G01S 17/42; G01S 17/66; G01S 7/4808; G01S 17/89; G01S 7/4813; G01S 7/4818;
(Continued)

(56) References Cited

U.S. PATENT DOCUMENTS

| 8,522,446 B1* | 9/2013 | Staudt | G01C 9/32 33/348.2 |
| 2002/0005522 A1* | 1/2002 | Miyokawa | G02B 6/4248 257/79 |

(Continued)

FOREIGN PATENT DOCUMENTS

| CN | 101206113 A | 6/2008 |
| CN | 103075963 A | 5/2013 |

(Continued)

OTHER PUBLICATIONS

World Intellectual Property Organization (WIPO) International Search Report for PCT/CN2018/096945 dated Nov. 2, 2018 6 pages.

*Primary Examiner* — Daniel Previl
(74) *Attorney, Agent, or Firm* — Anova Law Group, PLLC

(57) ABSTRACT

The present disclosure relates to a detector assembly, a detector, and a laser ranging system. The detector assembly includes a first laser receiving unit configured to receive laser emitted by a first laser emitting module or a laser level, and a second laser receiving unit configured to be substantially perpendicular to the first laser receiving unit. The second laser receiving unit includes a first portion used for receiving laser emitted by a second laser emitting module of the laser level and a second portion used for receiving the laser emitted by the second laser emitting module of the laser level, where the first portion is separated from the second portion by a first distance.

19 Claims, 3 Drawing Sheets

(51) Int. Cl.
*G01S 7/481* (2006.01)
*G01S 17/08* (2006.01)

(58) Field of Classification Search
CPC .......... G01S 7/491; G01S 7/481; G01S 5/163; G01S 11/12; G01S 17/08; G01S 17/74; G01S 17/86; G01S 7/48; G01S 7/4812; G01S 7/4816; G01S 7/497; G01C 15/002; G01C 3/08; G01C 15/06; G01C 15/004; G01C 15/02; G01B 11/03; G01B 11/002; G01B 11/26; G06F 17/40; G06F 19/00; G02B 5/122; G02B 5/12; G06T 2207/10004; G06T 5/10; G06T 7/73; A41H 37/008; B65C 7/005; B29C 64/106; B29C 64/118; B29C 64/321; B29C 70/70; B33Y 30/00; B33Y 50/02; A61B 17/00491; A61B 17/0057; A61B 17/12022; A61B 17/12118; A61B 17/12181; A61B 17/3468; A61B 18/02; A61B 18/04; A61B 18/1492; A61B 18/18; A61B 18/245; A61B 2017/00411; A61B 2017/00544; A61B 2017/0065; A61B 2017/00809; A61B 2017/00876; A61B 2017/1205; A61B 2017/22001; A61B 2018/00005; A61B 2018/00023; A61B 2018/00345; A61B 2018/00517; A61B 2018/00541; A61B 2018/00577; A61B 2018/00595; A61B 2018/00982; A61B 2018/1861; A61B 2090/372; A61B 2090/378; A61B 2218/002; A61B 34/30; A61B 34/37; A61B 34/76; A61B 5/6843; A61B 8/00; A61B 8/4218; A61F 2002/9528; A61F 2210/009; A61F 2/013; A61F 2/82; A61F 2/95; A61M 16/104; A61M 37/00; A61N 2005/1011; A61N 2007/0008; A61N 7/00; A61N 7/02; B25J 15/0253; B25J 18/025; B25J 5/02; B25J 9/023; B65G 1/0407; B65G 1/0485; B65G 1/137; B65G 1/1371; B65G 2203/0233; B65G 2203/0283; G05B 15/02; G05B 2219/45083; G06Q 10/08
USPC ....... 340/435, 436, 438–439, 444, 463, 455, 340/513, 518, 518.12, 636.1, 636.19, 340/691.6, 693.2
See application file for complete search history.

(56) References Cited

U.S. PATENT DOCUMENTS

| | | | |
|---|---|---|---|
| 2004/0101020 A1* | 5/2004 | Bhandarkar | G02B 6/4257 372/109 |
| 2008/0241843 A1* | 10/2008 | Zare | G01N 33/5005 435/6.12 |
| 2010/0321669 A1* | 12/2010 | Yamada | G01S 7/4812 356/4.01 |
| 2012/0262699 A1* | 10/2012 | Steffey | G01B 11/03 356/4.01 |
| 2015/0253124 A1* | 9/2015 | Steffey | G01B 11/002 356/614 |
| 2015/0377604 A1* | 12/2015 | Bridges | G01S 17/42 356/4.01 |
| 2017/0102461 A1* | 4/2017 | Tezuka | G01S 7/4972 |

FOREIGN PATENT DOCUMENTS

| | | |
|---|---|---|
| CN | 203489883 U | 3/2014 |
| CN | 206193236 U | 5/2017 |
| CN | 106886027 A | 6/2017 |
| CN | 107218920 A | 9/2017 |
| CN | 107290739 A | 10/2017 |
| CN | 207074263 U | 3/2018 |

\* cited by examiner

DETECTOR ASSEMBLY, DETECTOR, AND LASER RANGING SYSTEM

CROSS-REFERENCES TO RELATED APPLICATIONS

This application is a national phase entry under 35 U.S.C. § 371 of International Application No. PCT/CN2018/096945, filed on Jul. 25, 2018, which claims priority of Chinese patent application No. 201710661768.7, filed with the State Intellectual Property Office of P. R. China on Aug. 4, 2017, the entire contents of both of which are incorporated herein by reference in their entirety.

TECHNICAL FIELD

The present disclosure relates to distance measuring and positioning field, more particularly, to a detector assembly for use with a laser level, a detector including the previously described detector assembly, and a laser ranging system.

BACKGROUND

In conventional technology, Chinese Published Patent Application No. CN101206113A discloses a rangefinder and a ranging method thereof. The rangefinder according to the published patent application uses a rotating light source to provide a light beam with a predetermined rotation speed, and then uses a receiver to detect the time difference when the light beam is rotated from the first position to the second position of the receiver, and calculates the distance between the receiver and the rotating light source based on the detected time difference and the distance between the first position and the second position of the receiver. The rangefinder and the ranging method described above can conveniently implement the ranging function in the laser level, thereby improving the construction convenience for the engineers.

More specifically, reference may be made to FIG. 1, which illustrates a schematic diagram of a rangefinder based on the published patent application described above. As shown in FIG. 1, in order to improve the usefulness of construction convenience for the engineers, a rangefinder 10 is constructed on a single-axis rotating laser level 11 and a receiver 12 thereof. As such, the single-axis rotating laser level 11 can not only provide an automatically leveled rotating laser beam 13 to project a horizontal reference line on the construction wall, but also assist engineers to measure the distance needed for construction marking. In particular, the receiver 12 may further include a remote control circuit 16 for remote controller the operation of the single-axis rotating laser level 11, such as the rotation speed, which can be used as a remote controller for remotely controlling the single-axis rotating laser level 11. In FIG. 1, in addition to using the a rotating light source composed of the single-axis rotating laser level 11 to provide the laser beam 13 at a predetermined rotation speed, the receiver 12 can also be used to detect the time difference when the laser beam is rotated from a first position 14 to a second position 15 of the receiver. As such, the distance between the receiver 12 and the single-axis rotating laser level 11 can be calculated based on the time difference and the distance between the first position 14 and the second position 15.

It should be apparent from the above description that a laser receiving device includes an independent first receiving circuit and a second receiving circuit. Further, the first receiving circuit and the second receiving circuit can respectively include a conversion circuit connected to a light sensor to convert the current signal into a voltage signal; an amplifier circuit connected to the conversion circuit to amplify the voltage signal; and a comparator connected to the amplifier circuit to compare the amplified voltage signal with a reference level, and output an electric signal representing the detected light beam.

Therefore, each laser detector device needs to include at least two sets of light sensors, conversion circuits, amplifier circuits, and comparators. As such, the production cost of the laser receiving device is high, and the structure of the laser receiving device is complicated. In addition, since such a detector assembly includes only the laser receiver 12 in one direction, the detector assembly cannot guarantee the three distances from the light beam to the first position 14, from the light beam to the second position 15, and between the first position and the second position to form an isosceles triangle. As such, the calculated distance between a light beam emitting position and the detector assembly is inaccurate, and the error is uncontrollable.

SUMMARY

In view of the technical problem described above, that is, the inevitable technical problem of inaccurate ranging in prior art, the present disclosure provides a detector assembly for use with a laser level. The detector assembly includes a first laser receiving unit configured to receive laser emitted from a first laser emitting module of the laser level and a second laser receiving unit configured to be arranged to be substantially perpendicular to the first laser receiving unit. The second laser receiving unit also includes a first portion for receiving laser emitted from a second laser emitting module of the laser level and a second portion for receiving the laser emitted from the second laser emitting module of the laser level, where the first portion and the second portion are separated by a first distance.

When in use, in accordance with the present disclosure, the detector assembly is arranged vertically. At this moment, the first laser receiving unit of the detector assembly is also arranged vertically, that is, arranged to be perpendicular to a horizontal surface. Accordingly, with the laser level capable of emitting a horizontal laser, and through a certain adjustment process, the horizontal laser surface emitted from the laser level is ensured to be in the middle between the first portion for receiving the laser emitted from the second laser emitting module of the laser level and the second portion for receiving the laser emitted from the second laser emitting module of the laser level, so that the distances from the first portion of the detector assembly for receiving the laser emitted from the second laser emitting module of the laser level and the second portion of the detector assembly for receiving the laser emitted from the second laser emitting module of the laser level to the first laser emitting module of the laser level can be ensured to be the same. Through a corresponding setting, the distances from the first portion of the detector assembly for receiving the laser emitted from the second laser emitting module of the laser level and the second portion of the detector assembly for receiving the laser emitted from the second laser emitting module of the laser level to the second laser emitting module of the laser level can be consequentially ensured to be the same.

Accordingly, through the scanning/rotation speed of the second laser emitting module of the laser level, the first distance between the first portion for receiving the laser emitted from the second laser emitting module of the laser level and the second portion for receiving the laser emitted from the second laser emitting module of the laser level, and the time difference between the corresponding times when the laser passes the first portion for receiving the laser emitted from the second laser emitting module of the laser level and the second portion for receiving the laser emitted from the second laser emitting module of the laser level, a precise distance between the laser level and the detector assembly can be determined according to a trigonometric function relationship.

In accordance with an embodiment of the present disclosure, the detector assembly may also include a signal processing module, which is configured to process the laser received by the first laser receiving unit and/or the laser received by the second laser receiving unit.

In accordance with an embodiment of the present disclosure, the first portion and the second portion of the second laser receiving unit have the same lengths and are arranged parallel to each other.

In accordance with an embodiment of the present disclosure, the distances from the first portion and the second portion of the second laser receiving unit to the first laser receiving unit are the same.

In accordance with an embodiment of the present disclosure, the first laser receiving unit and/or the second laser receiving unit are configured as photoelectric sensors.

In accordance with an embodiment of the present disclosure, the second laser receiving unit is configured as a light guiding element. The first portion of the light guiding element is configured to receive light beam and transmit the light beam to a first target position, and the second portion of the light guiding element is configured to receive the light beam and transmit the light beam to the first target position.

In accordance with an embodiment of the present disclosure the detector assembly may also include light sensing elements, which are arranged at the first target position.

In accordance with an embodiment of the present disclosure, the detector assembly may also include an amplifier circuit, which is configured to be coupled between the first laser receiving unit and/or the second laser receiving unit and the signal processing module. The amplifier circuit is also configured to amplify the electrical signal converted from the optical signal from the first laser receiving unit and/or the second laser receiving unit and output to the signal processing module.

In accordance with an embodiment of the present disclosure, the detector assembly may also include a filter circuit, which is configured to be coupled with the first laser receiving unit and/or the second laser receiving unit and the signal processing module. The filter circuit is also configured to filter the electrical signal converted from the optical signal from the first laser receiving unit and/or the second laser receiving unit and output to the signal processing module.

In addition, in accordance with a second aspect of the present disclosure, a detector that can be used with the laser level is provided. The detector includes the detector assembly provided in accordance with the first aspect of the present disclosure.

In accordance with a third aspect of the present disclosure, a laser ranging system is provided. The laser ranging system includes the detector provided in accordance with the second aspect of the present disclosure.

As mentioned above, with the detector assembly and the corresponding laser ranging system provided in accordance with the present disclosure, the straight-line distance between the laser level and the detector assembly can be measured accurately.

BRIEF DESCRIPTION OF THE DRAWINGS

Embodiments are illustrated and set forth with reference to the accompanying figures. These figures are for purpose of clarifying basic principles, thus only illustrating the aspects necessary for understanding the basic principles. These figures are not drawn to scale. The same reference labels have been repeated among the figures to indicate analogous features.

Other characteristics, features, advantages and benefits of the present disclosure will be more apparent from the detailed description below in connection with the accompanying figures.

DETAILED DESCRIPTION OF THE EMBODIMENTS

In the following detailed description of preferred embodiments, reference will be made to the accompanying figures which constitute a part of the present disclosure. The accompanying figures illustrate specific embodiments capable of implementing the present disclosure by way of example. The exemplary embodiments are not intended to exhaust all embodiments in accordance with the present disclosure. It can be understood that other embodiments may be utilized, or structural or logical modifications may be made without departing the scope of the present disclosure. Therefore, the following detailed description is not limiting, and the scope of the present disclosure is defined by the appended claims.

The applicant of this application wishes to make clear that the terms "arranged horizontally" and "arranged vertically" mentioned in the context of the application both refer to the arrangement of light sensing elements included in the laser receiving device. The term "arranged vertically" means that light sensing elements, e.g., the light sensing stripes, in the laser receiving device are arranged to be substantially perpendicular to a horizontal plane, and the term "arranged horizontally" means that light sensing elements, e.g., e.g., the light sensing stripes, in the laser receiving device are arranged substantially on the same horizontal plane.

Figure 1:
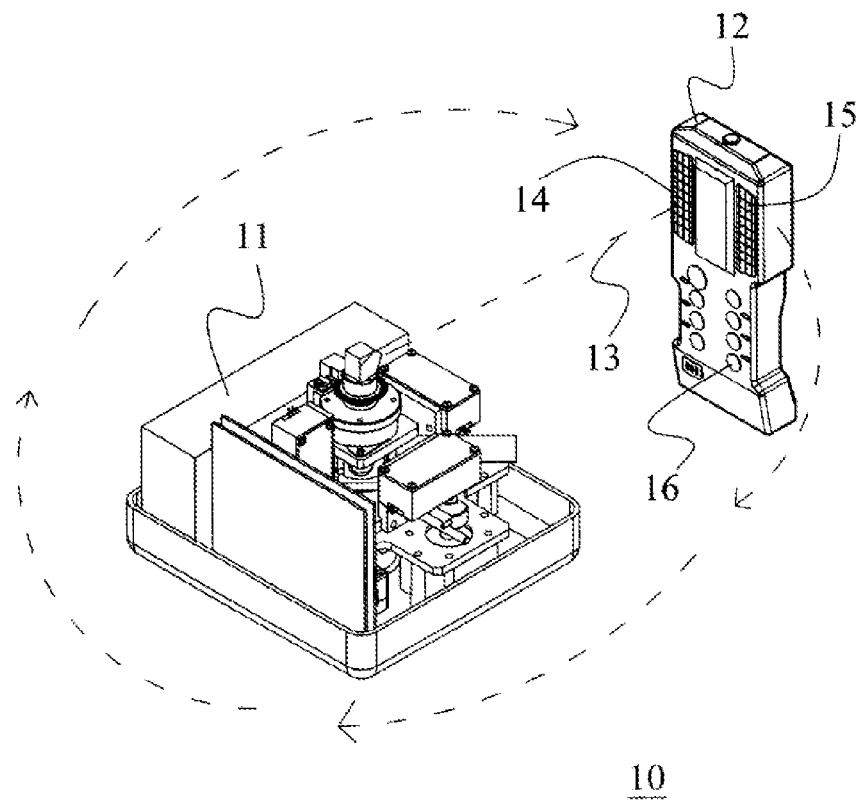
FIG. 1 is a schematic diagram of a rangefinder 10 according to a prior technology.

In view of the technical problem that the laser receiving device in FIG. 1 cannot control the error when performing the distance measurement between the laser emitting device and the laser receiving device to perform accurate distance measurement, new structures of detector assemblies are provided and shown in FIG. 2 to FIG. 5. In accordance with the present disclosure, the detector assemblies and each embodiment of the detector assemblies will be described in relation to FIG. 2 to FIG. 5. Those of skill in the art would understand that the embodiments of FIG. 2 to FIG. 5 are merely exemplary and not restrictive, are only used to exemplarily show possible structural forms of the detector assemblies according to the present disclosure, and are not intended to exhaust all possible structural forms of the detector assemblies according to the present disclosure. Those skilled in the art can make modifications to these embodiments based on this technology without exceeding the concept of the present disclosure, and the modified variants are still within the scope of the present disclosure.

Figure 2:
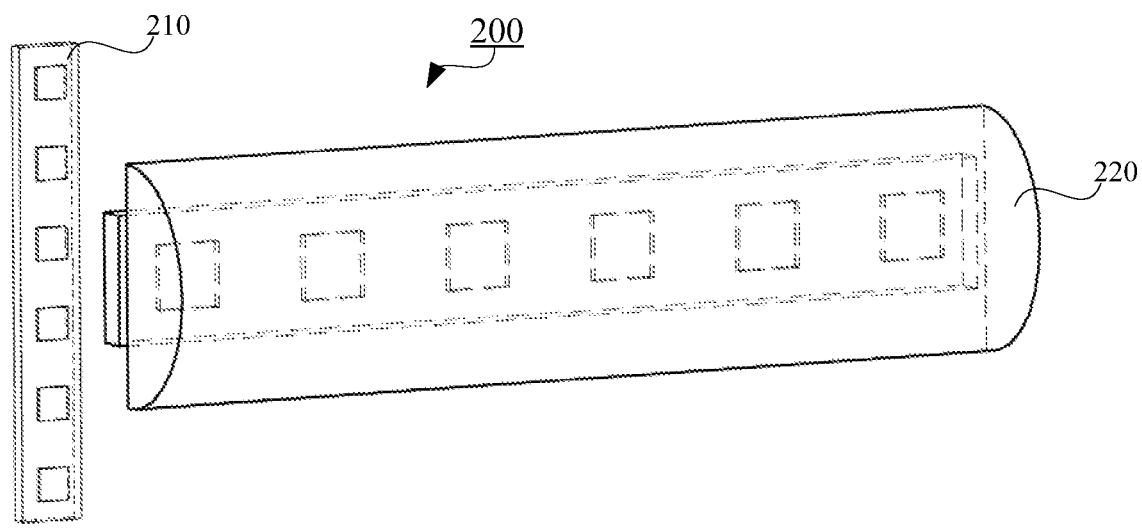
FIG. 2 is a schematic diagram of a detector assembly 200 according to an embodiment of the present disclosure.

As shown in FIG. 2, in accordance with the present disclosure, a detector assembly 200 includes a first laser receiving unit 210, and the first laser receiving unit 210 is configured to receive laser emitted from a first laser emitting module (not shown in the Figure) of a laser level (not shown in the Figure). In accordance with the present disclosure, the detector assembly 200 also includes a second laser receiving unit 220. The second laser receiving unit 220 is configured to be substantially perpendicular to the first laser receiving unit 210 and includes a first portion for receiving the laser emitted from a second laser emitting module of the laser level and a second portion for receiving the laser emitted from a second laser emitting module of the laser level, where the first portion and the second portion are separated by a first distance.

Figure 3:
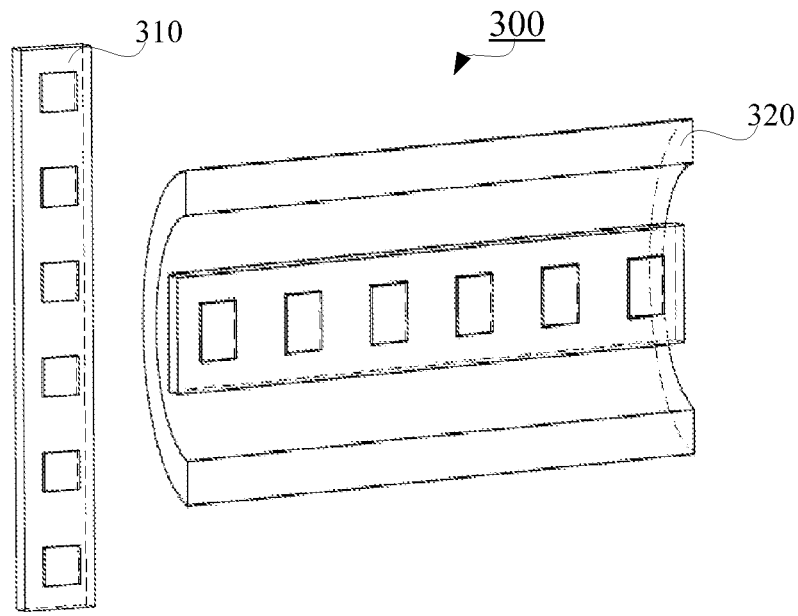
FIG. 3 is a schematic diagram of a detector assembly 300 according to another embodiment of the present disclosure.

FIG. 3 shows a schematic diagram of a detector assembly 300 according to another embodiment of the present disclosure. As shown in FIG. 3, in accordance with the present disclosure, the detector assembly 300 includes a first laser receiving unit 310, and the first laser receiving unit 310 is configured to receive laser emitted from a first laser emitting module (not shown in the figure) of a laser level (not shown in the figure). In accordance with the present disclosure, the detector assembly 300 includes a second laser receiving unit 320. The second laser receiving unit 320 is configured to be substantially perpendicular to the first laser receiving unit 310 and includes a first portion for receiving the laser emitted from the second laser emitting module of the laser level and a second portion for receiving the laser emitted from the second laser emitting module of the laser level, where the first portion and the second portion are separated by a first distance.

Figure 4:
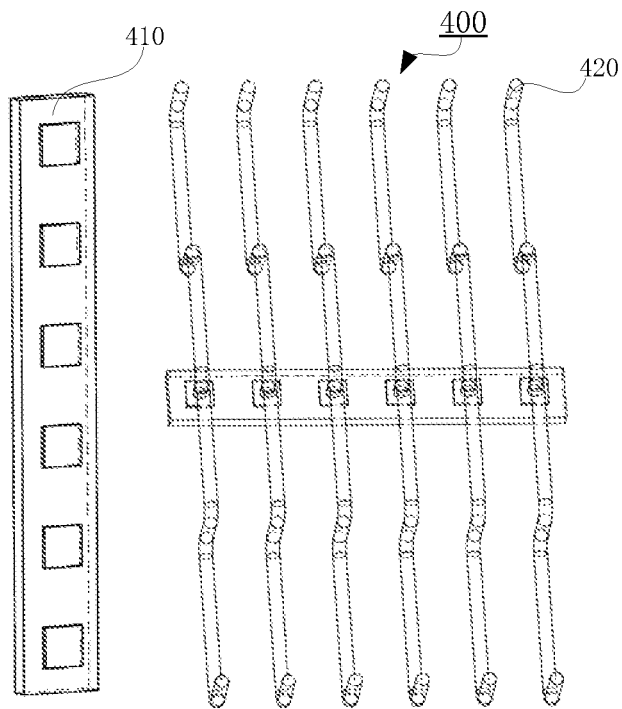
FIG. 4 is a schematic diagram of a detector assembly 400 according to another embodiment of the present disclosure.

FIG. 4 shows a schematic diagram of a detector assembly 400 according to another embodiment of the present disclosure. As shown in FIG. 4, in accordance with the present disclosure, a detector assembly 400 includes a first laser receiving unit 410, and the first laser receiving unit 410 is configured to receive laser emitted from a first laser emitting module (not shown in the figure) of a laser level (not shown in the figure). In accordance with the present disclosure, the detector assembly 400 includes a second laser receiving unit 420. The second laser receiving unit 420 is configured to be substantially perpendicular to the first laser receiving unit 410 and includes a first portion for receiving the laser emitted from the second laser emitting module of the laser level and a second portion for receiving the laser emitted from the second laser emitting module of the laser level. The first portion and the second portion are separated by a first distance. In the embodiment shown in FIG. 4, the second laser receiving unit 420 includes six optical fibers, and each optical fiber has optical fiber light guiding heads at an upper side and a lower side of the direction shown in the figure. When a light beam passes by, the light beam is received and transmitted to the corresponding light sensing elements. Those skilled in the art would understand that the six optical fibers shown here are only exemplary and not restrictive. In accordance with the present disclosure, the optical detector assembly may include more than or fewer than six optical fibers.

Figure 5:
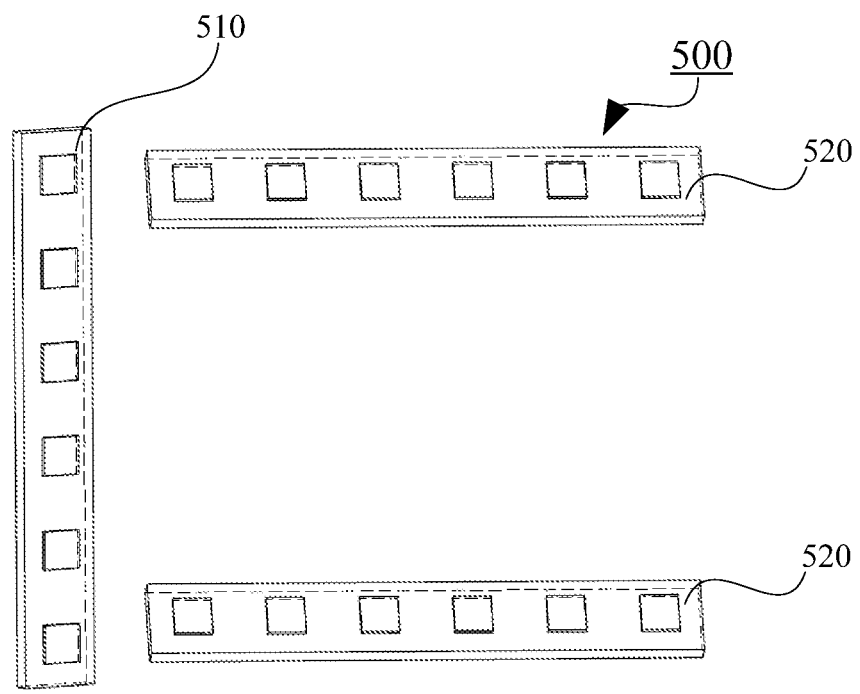
FIG. 5 is a schematic diagram of a detector assembly 500 according to another embodiment of the present disclosure.

FIG. 5 shows a schematic diagram of a detector assembly 400 according to another embodiment of the present disclosure. As shown in FIG. 5, in accordance with the present disclosure, a detector assembly 500 includes a first laser receiving unit 510, and the first laser receiving unit 510 is configured to receive laser emitted from a first laser emitting module (not shown in the figure) of a laser level (not shown in the figure). In accordance with the present disclosure, the detector assembly 500 includes a second laser receiving unit 520. The second laser receiving unit 520 is configured to be substantially perpendicular to the first laser receiving unit 510 and includes a first portion for receiving the laser emitted from the second laser emitting module of the laser level and a second portion for receiving the laser emitted from the second laser emitting module of the laser level. The first portion and the second portion are separated by a first distance.

In one embodiment of the present disclosure, the detector assemblies also include timer modules. The timer modules are configured to calculate the time differences between the times when each of the respective first portions and each of the respective second portions of the second laser receiving units 220, 320, 420, and 520 sense the laser. By knowing the laser scan speed of the laser emitting module of the laser level and the time difference when the laser passes the first portion and the second portion, the distance between the laser level and the detector assembly can be calculated according to the first distance.

The first portion and the second portion are configured correspondingly at the two positions of the second laser receiving units 220 and 320. As shown in FIG. 2, the second laser receiving unit 220 includes the first portion for receiving and transmitting the light beam to the light sensing elements (elements with dashed lines shown in the figure) and the second portion for receiving and transmitting the light beam to the light sensing elements. In the embodiment, the first portion for receiving and transmitting the light beam to the light sensing elements and the second portion for receiving and transmitting the light beam to the light sensing elements form a pair of measuring points. In each measurement, the laser beam will pass each part of a pair of measuring points in sequence. In the embodiment shown in FIG. 2, the first portion and the second portion are arranged at the two sides of the second laser receiving unit 220.

The first portion and the second portion at two sides of the second laser receiving unit 220 are merely exemplary not restrictive and the first portion and the second portion may also be arranged at other positions. For example, the first portion may be configured to receive and transmit the light beam to the light sensing elements at first, and the second portion may be configured to receive and transmit the light beam to the light sensing elements at last. In the embodiment shown in FIG. 2, the portion that receives and transmits the light beam to the light sensing elements at first may be the first portion for receiving and transmitting the light beam to the light sensing elements 210, at the upper side, and the portion that receives and transmits the light beam to the light sensing elements at last may be the second portion for receiving and transmitting the light beam to the light sensing elements, for example, at the bottom side. Applying the method in the embodiment, the measurement can be performed at the longest measurement distance i.e., at the longest measurement time, to reduce error and improve measurement precision.

Accordingly, when in use, in accordance with the present disclosure, the detector assembly 200 may be arranged vertically. At this moment, the first laser receiving unit 210 contained in the detector assembly 200 is also arranged vertically, that is, arranged to be perpendicular to the horizontal surface. Accordingly, with the laser level capable of emitting horizontal laser, and through a certain adjustment process, the horizontal laser emitted from the laser level is ensured to be in the middle between the first portion for receiving the laser emitted from the second laser emitting module of the laser level and the second portion for receiving the laser emitted from the second laser emitting module of the laser level, so that the distances from the first portion of the detector assembly 200 for receiving the laser emitted from the second laser emitting module of the laser level and the second portion of the detector assembly 200 for receiving the laser emitted from the second laser emitting module of the laser level to the first laser emitting module of the laser level can be ensured to be the same. Through a corresponding setting, the distances from the first portion of the detector assembly 200 for receiving the laser emitted from the second laser emitting module of the laser level and the second portion of the detector assembly 200 for receiving the laser emitted from the second laser emitting module of the laser level to the second laser emitting module of the laser level can be consequentially ensured to be the same. Accordingly, given the scanning or rotation speed of the second laser emitting module of the laser level, the first distance between the first portion for receiving the laser emitted from the second laser emitting module of the laser level and the second portion for receiving the laser emitted from the second laser emitting module of the laser level, and the time difference between the corresponding times when the laser passes the first portion for receiving the laser emitted from the second laser emitting module of the laser level and the second portion for receiving the laser emitted from the second laser emitting module of the laser level, the precise distance between the laser level and the detector assembly 200 can be determined according to a trigonometric function relationship. How to calculate the precise distance between the laser level and the detector assembly 200 according to the trigonometric function relationship known to those skilled in the art, so it will not be repeated herewith.

In accordance with an embodiment of the present disclosure, the detector assembly 200 also includes a signal processing module (not shown in the figure), which is configured to process the laser received by the first laser receiving unit 210 and the laser received by the second laser receiving unit 220. For example, the signal processing module can perform operations such as analog to digital conversions, etc., to electric signals generated according to the laser received by the first laser receiving unit 210 and the laser received by the second laser receiving unit 220, so that a transferability and anti-inference ability of the electrical signals are improved.

In accordance with an embodiment of the present disclosure, the first portion and second portion of the second laser receiving unit 220 have the same lengths and are arranged parallel to each other.

Specifically, in the embodiment shown in FIG. 2, the first portion and the second portion are located at two sides of the semi-cylindrical second laser receiving unit 220 (e.g., a semi-cylindrical lens), respectively. Correspondingly, the first portion and the second portion of the second laser receiving unit 220 have the same lengths and are arranged parallel to each other. In the embodiment shown in FIG. 3, the first portion and the second portion are located at two sides of the spherical mirror-shaped second laser receiving unit 320 (e.g., a cylindrical mirror). Correspondingly, the first portion and the second portion of the second laser receiving unit 320 have the same lengths and are arranged parallel to each other. In the embodiment shown in FIG. 4, the second laser receiving unit 420 constitutes a plurality of optical fibers arranged parallel to each other, and the optical fibers are parallel to each other and have the same lengths. Correspondingly, in the embodiment shown in FIG. 5, the second laser receiving unit 520 constitutes two silicon photocell modules which are arranged parallel to each other and have the same lengths. Those skilled in the art would understand that the first laser receiving unit and/or the second laser receiving unit may also be configured as photoelectric sensors, which can be made of avalanche photo diodes (APD), charge-coupled elements (CCD), other solar cells, or other materials that can sense laser. The solar cells are preferably the silicon photovoltaic modules.

In accordance with an embodiment of the present disclosure, the distances from the first portions and the second portions of the second laser receiving units 220, 320, and 520 to the first laser receiving units may be same. In other words, in FIG. 2, FIG. 3, and FIG. 5, the distances from the second laser receiving units 220, 320, and 520 to the end sides of the first laser receiving units 210, 310, and 510 are the same, and when in use, the first laser receiving units 210, 310, and 510 are arranged vertically.

In accordance with an embodiment of the present disclosure, the second laser receiving units 220, 320, and 420 are configured as light guiding elements. The first portion of the light guiding element is configured for receiving light beam and transmitting the light beam to the first target position, and the second portion of the light guiding element is configured for receiving light beam and transmitting the light beam to the first target position. In the embodiments shown in FIG. 2 to FIG. 4, the second laser receiving units 220, 320, and 420 are configured as the light guiding elements. In the embodiments shown in FIG. 2 to FIG. 4, the detector assemblies 200, 300, and 400 also include light sensing elements, which are located at the first target position. In the embodiment shown in FIG. 5, the second laser receiving unit 520 is configured as two separate silicon photovoltaic modules.

In the above embodiments, the elements used as the second laser receiving units 220 and 320 in the concept of the present disclosure can be configured as, for example, spherical mirrors, free-form surface mirrors, aspheric mirrors, light guiding columns, light guiding surfaces, plane mirrors, optical fibers, or reflecting mirrors.

When the second laser receiving units 220, 320, and 420 are configured as light guiding elements, compared to the second laser receiving unit 520 shown in FIG. 5, only a set of light sensing elements need to be configured, so that the structure of the detector assembly is simplified, and the cost of the detector assembly is accordingly reduced.

To improve the processing accuracy of the electrical signals, in accordance with an embodiment of the present disclosure, the detector assembly also includes an amplifier circuit, and the amplifier circuit is configured to be coupled between the first laser receiving unit and/or the second laser receiving unit and the signal processing module. The amplifier circuit is also configured to amplify and output the electrical signals converted from the optical signals from the first laser receiving unit and/or the second laser receiving unit to the signal processing module.

To improve the anti-interference ability of the electrical signal in the detector assembly according to the present disclosure, the detector assembly also includes a filter circuit, and the filter circuit is configured to be coupled between the first laser receiving unit and/or the second laser receiving unit and the signal processing module. The filter circuit is also configured to filter and output the electrical signal converted from the optical signal from the first laser receiving unit and/or the second laser receiving unit to the signal processing module.

In addition, in accordance with a second aspect of the present disclosure, a detector is provided for use with the laser level. The detector includes the detector assembly in accordance with the first aspect of the present disclosure.

In accordance with a third aspect of the present disclosure, a laser ranging system is provided, and the laser ranging system includes the detector in accordance with the second aspect of the present disclosure.

As discussed above, embodiments according to the present disclosure use the detector assembly and the corresponding laser ranging system to accurately measure the straight-line distance between the laser level and the detector assembly.

Those skilled in the art should understand that, various variations and modifications may be made to the various embodiments disclosed above without departing from the nature of the invention. Thus, the scope of the invention should be defined by the appended claims.

Although different exemplary embodiments have been described, it would be apparent to those skilled in the art that, different changes and modifications may be made which may implement some of the advantages of the invention without departing the spirit and scope of the invention. For those skilled in the art, other components performing the same function may be properly substituted. It should be noted that, here the features explained with reference to specific figures may be combined with the features of other figures, even if in cases where it is not explicitly mentioned. Further, methods of the invention may be implemented in all software implementations using proper processor instructions or in mixed implementations which obtain the same result utilizing the combination of hardware logics and software logics. Such modifications to the scheme in accordance with the invention are intended to be covered by the appended claims.

What is claimed is:

1. A detector assembly for use with a laser level, comprising:
   a first laser receiving unit configured to receive laser emitted from a first laser emitting module of the laser level; and
   a second laser receiving unit configured to be perpendicular to the first laser receiving unit, the second laser receiving unit including a first portion for receiving laser emitted from a second laser emitting module of the laser level, and a second portion for receiving the laser emitted from the second laser emitting module, the second laser emitting module including a rotating light source that emits the laser at a rotation speed, wherein the first portion and the second portion are apart by a first distance,
   wherein the detector assembly and the laser level are placed at different locations; and
   a distance between the detector assembly and the laser level is measured according to a time difference between when the first portion and the second portion of the second laser receiving unit sense the laser emitted from the second laser emitting module, the rotation speed of the rotating light source, and the first distance.

2. The detector assembly of claim 1, further comprising a signal processing module, wherein the signal processing module is configured to process the laser received by the first laser receiving unit or the laser received by the second laser receiving unit.

3. The detector assembly of claim 2, further comprising:
   an amplifier circuit, coupled between the first laser receiving unit, the second laser receiving unit, and the signal processing module, and to amplify electrical signals converted from optical signals from the first laser receiving unit or the second laser receiving unit and to output amplified signals to the signal processing module.

4. The detector assembly of claim 2, further comprising:
   a filter circuit, coupled between the first laser receiving unit, the second laser receiving unit, and the signal processing module, and to filter electrical signals converted from optical signals from the first laser receiving unit or the second laser receiving unit and to output filtered signals to the signal processing module.

5. The detector assembly of claim 1, wherein the first portion and the second portion of the second laser receiving unit have same lengths and are parallel to each other.

6. The detector assembly of claim 1, wherein the first laser receiving unit and the second laser receiving unit include photovoltaic sensors.

7. The detector assembly of claim 1, wherein the second laser receiving unit includes a light guiding element, a first portion of the light guiding element is configured to receive a light beam and transmit the light beam to a first target position, and a second portion of the light guiding element is configured to receive the light beam and transmit the light beam to the first target position.

8. The detector assembly of claim 7, further comprising light sensing elements, wherein the light sensing elements are arranged at the first target position.

9. A detector for use with a laser level including a detector assembly, the detector assembly comprising:
   a first laser receiving unit configured to receive laser emitted from a first laser emitting module of the laser level; and
   a second laser receiving unit configured to be perpendicular to the first laser receiving unit, the second laser receiving unit including a first portion for receiving laser emitted from a second laser emitting module of the laser level, and a second portion for receiving the laser emitted from the second laser emitting module, the second laser emitting module including a rotating light source that emits the laser at a rotation speed, wherein the first portion and the second portion are apart by a first distance,
   wherein the detector assembly and the laser level are placed at different locations; and
   a distance between the detector assembly and the laser level is measured according to a time difference between when the first portion and the second portion of the second laser receiving unit sense the laser emitted from the second laser emitting module, the rotation speed of the rotating light source, and the first distance.

10. A laser ranging system comprising a detector assembly to range a distance between a laser level and the detector assembly, the detector assembly comprising:
    a first laser receiving unit configured to receive laser emitted from a first laser emitting module of the laser level; and
    a second laser receiving unit configured to be perpendicular to the first laser receiving unit, the second laser receiving unit including a first portion for receiving laser emitted from a second laser emitting module of the laser level, and a second portion for receiving the laser emitted from the second laser emitting module, the second laser emitting module including a rotating light source that emits the laser at a rotation speed, wherein the first portion and the second portion are apart by a first distance, wherein the detector assembly and the laser level are placed at different locations; and a distance between the detector assembly and the laser level is measured according to a time difference between when the first portion and the second portion of the second laser receiving unit sense the laser emitted from the second laser emitting module, the rotation speed of the rotating light source, and the first distance.

11. The laser ranging system of claim 10, wherein the second laser receiving unit includes optical fibers with optical fiber light guides at an upper side and a lower side.

12. The laser ranging system of claim 10, further comprising a timer module configured to calculate the time difference between when the first portion and the second portion of the second laser receiving unit sense the laser emitted from the second laser emitting module.

13. The laser ranging system of claim 12, wherein:
the first portion is configured to receive and transmit a light beam to photo sensing elements first; and
the second portion is configured to receive and transmit a light beam to the photo sensing elements last.

14. The laser ranging system of claim 13, wherein:
the first portion for receiving and transmitting the light beam to the photo sensing elements first is arranged at an upper side; and
the second portion for receiving and transmitting the light beam to the photo sensing elements last is arranged at a lower side.

15. The laser ranging system of claim 14, wherein a measurement is performed at a longest measurement distance.

16. The laser ranging system of claim 15, wherein:
the detector assembly is arranged vertically; and
the first laser receiving unit of the detector assembly is arranged perpendicularly to a horizontal plane.

17. The laser ranging system of claim 16, wherein horizontal laser plane emitted from the laser level is in a middle position between the first portion of the detector assembly and the second portion of the detector assembly.

18. The laser ranging system of claim 17, wherein distances from the first portion of the detector assembly and the second portion of the detector assembly to the first laser receiving unit are the same.

19. The laser ranging system of claim 18, wherein the distances from the first portion of the detector assembly and the second portion of the detector assembly to the second laser receiving unit are the same.

* * * * *